United States Patent [19] [11] 4,109,080
Lieser et al. [45] Aug. 22, 1978

[54] ION EXCHANGE COMPOUNDS ON CELLULOSE BASIS AND PROCESS FOR THE MANUFACTURE THEREOF

[75] Inventors: Karl Heinrich Lieser, Seeheim; Peter Burba, Lampertheim, both of Fed. Rep. of Germany

[73] Assignee: Riedel-de Haen Aktiengesellschaft, Seelze, Hannover, Fed. Rep. of Germany

[21] Appl. No.: 810,963

[22] Filed: Jun. 29, 1977

[30] Foreign Application Priority Data

Jul. 1, 1976 [DE] Fed. Rep. of Germany ....... 2629542

[51] Int. Cl.$^2$ ............................................. C08B 11/00
[52] U.S. Cl. ......................................... 536/43; 521/25
[58] Field of Search ...................... 536/43; 260/2.1 R

[56] References Cited
U.S. PATENT DOCUMENTS 4,022,964  5/1977  Lieser et al. .......................... 536/43

Primary Examiner—Ronald W. Griffin
Attorney, Agent, or Firm—Curtis, Morris & Safford

[57] ABSTRACT

The present invention relates to ion exchange compounds on cellulose basis having formula

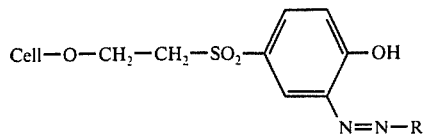

wherein R is a group that forms chelate complexes with metal ions, and Cell stands for the cellulose matrix. Suitable functional groups R are derivatives of known metal reactants, which show a high degree of selectivity for specific metal ions. The ion exchange compounds are able to fix specifically preferred ions e.g. metal ions even in a considerable excess of foreign ions, for example in concentrated salt solutions.

The improved ion exchange compounds of this invention are prepared by reacting the compound

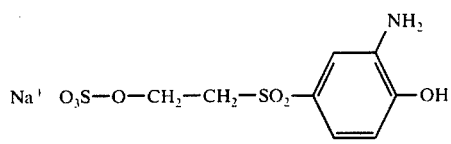

with cellulose in the presence of alkali, diazotizing the cellulose derivative resulting therefrom and subsequently coupling couplable compounds which form chelate complexes with metal ions.

3 Claims, No Drawings

ION EXCHANGE COMPOUNDS ON CELLULOSE BASIS AND PROCESS FOR THE MANUFACTURE THEREOF

The present invention relates to ion exchange (or ion exchange compounds) on cellulose basis. Cellulose basis ion exchange compounds are known in the art having the formula

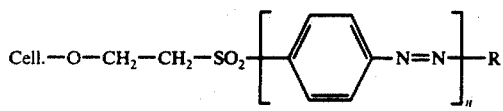

wherein R is a group that forms chelate complexes with metal ions, $n = 0$ or 1 and Cell stands for the cellulose matrix. Examples of suitable functional groups R that are derivatives of known metal reactants are given in table I, for example 8-hydroxy-quinoline, Tiron, chromotropic acid, 1-(2-hydroxyphenylazo)-2-naphthol (Hyphan), Alizarin S, morin, dithizone, glyoxalbis-(2-hydroxyanile), bis-(salicyliden)-1,2-diaminoethane (Salen), 1,2-bis-(salicylidenamino)-benzene (Salphen), ethylene diamine-N,N'-bis-(o-hydroxyphenylacetic acid) (Chel I), N,N'-di-(2-hydroxybenzyl)ethylene diamine-N,N'-diacetic acid (Chel II), N-(2-hydroxybenzyl-)ethylene diamine-N,N', N'-triacetic acid (Chel III), thioglycolic acid amide, diphenylcarbazide, salicyl aldoxime, 5-(4-dimethylaminobenzylidene)-rhodanine, thenoyltrifluoroacetone (TTA) and numerous others. These groups are characterized by high distribution coefficients for specific ions, i.e. they are capable of fixing these metal ions with a high degree of selectivity. Therefore, Table I indicates also the selectivity of said anchor groups for specific metal ions as well as their $pK_1$ values. These results make evident that in many cases there are formed chelate complex compounds having very high stability constants enabling the compound of this type to fix the specifically preferred ions even in a considerable excess of foreign ions, for example in concentrated salt solutions.

Such compounds on cellulose basis may be prepared in various ways.

It is possible, if $n$ is zero in the above mentioned formula, to react cellulose or cellulose-like compounds with β-hydroxyethyl sulfone derivatives, preferably reacting the compound

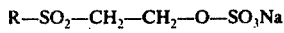

with cellulose. In that case R has the afore described meaning.

Another process for preparing such cellulose compounds is used if $n = 1$. The cellulose derivative which is prepared from cellulose and an amino derivative of β-hydroxyethylsulfone, e.g.

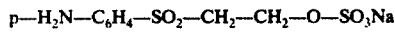

is then diazotized and subsequently reacted by coupling with appropriate couplable groups forming chelates with metal ions. The processes are described by "Angewandte Makromolekulare Chemie" 50 (1976), 151 sq.

Compounds of this type may be used as well for separating trace elements from water or aqueous salt solutions and also for separating trace elements from organic solvents or solvent mixtures.

For cellulose compounds of the described type wherein $n = 1$, the process of preparation applied in the past may be represented by the following reaction equations:

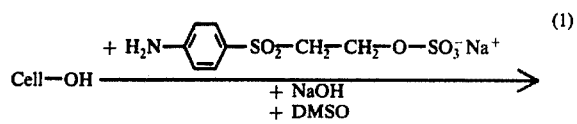

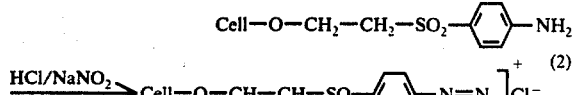

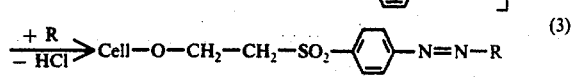

A certain disadvantage of this reaction resides in the fact that the yield of the reaction (2) is only about 65% of the theoretical yield and the yield of the reaction (3) is only about 40–60% of the theoretical yield. Therefore, the thus produced cellulose compounds contain large quantities of free $NH_2$ groups, and after decomposition of the diazonium groups formed according to equation (2), free phenolic groups. Both groups may interfere with the ion exchange on the anchor group R.

It has been found that these disadvantages are overcome by compounds on cellulose basis having formula

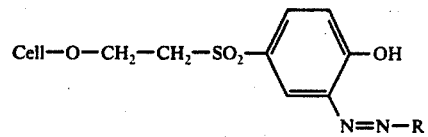

wherein R is a group forming chelate complexes with metal ions and Cell is the cellulose. Suitable functional groups R being derived from known metal reactants, are the above mentioned compounds which are also specified as examples in the present specification. Especially preferred are compounds wherein R is the group

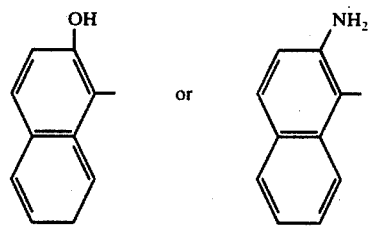

These compounds may be prepared with an almost perfect yield according to the following reaction scheme:

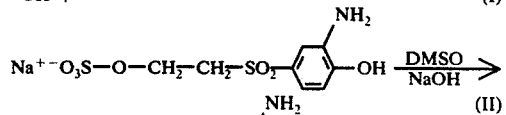

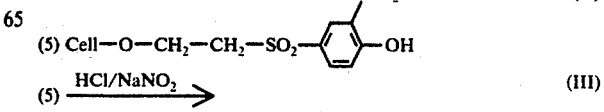

-continued

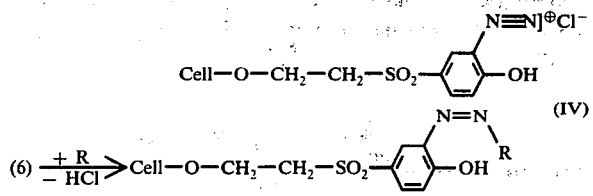

The partial reaction (4) comprises first reacting pulverulent or fibrous cellulose with the compound (I) in organic solvents such as dimethylsulfoxide under action of sodium hydroxide; thus is formed the cellulose derivative (II). This latter contains nitrogen in the amount of 0.6 to 1.4 weight %, depending on the reaction conditions. Subsequently the compound (II) is diazotized in known manner, for example in 5N hydrochloric acid containing 1% of sodium nitrite, to form the compound (III).

This compound (III) may be converted to a cellulose compound of formula (IV) by a simple coupling reaction, R may represent e.g. β-naphthol, β-naphthylamine, thenoyl-trifluoroacetone (TTA), glyoxal-bis-(2-hydroxy-anile), ethylene diamine-N,N'-bis-(o-hydroxyphenylacetic acid) or other compounds that form chelate complexes with metal ions and that are specified in the enclosure as representative examples. The resulting cellulose compounds have a capacity of 0.4 to 1.0 mMole/g.

The reactions (5) and (6) lead—in contradistinction to other diazotizing and coupling reactions of polymer compounds— to an almost perfect yield. Interfering amino and phenolic groups such as are obtained by the reactions (2) and (3) are avoided by the reactions (5) and (6), so that compounds of a uniform composition are obtained. Moreover, the phenolic radical in 1-position and the diazo function in 2-position may be used as additional coordinating positions for the ion exchange. Accordingly poly-functional chelating compounds with selective properties are formed.

Finally, by simple diazotation and coupling with a large number of various ligands R, such as are named in the specification, numerous selective cellulose exchange compounds may be prepared.

The following examples illustrate the invention:

EXAMPLE 1

A cellulose compound of formula IV containing as the functional group R β-naphthyl, was synthesized in three steps.

(a) Preparation of the cullulose derivative II (b) Diazotation of compound II (c) Coupling of the resulting diazonium derivative III with 2-naphthol.

(a) 10 g (0.06 mole) of cellulose cross-linked with formaldehyde was suspended in 70 ml of dimethylsulfoxide + 2 ml H$_2$O and 6 g (0.15 mole) of pulverulent sodium hydroxide were added while stirring. The mixture was maintained at 75° C for 1 hour. Subsequently 21.2 g (0.065 mole) of compound I were added and the reaction mixture was stirred at 75° C for 15 hours. The reaction was terminated by addition of 100 ml of 10% hydrochloric acid, the reaction product was filtered off and washed several times with hot water and acetone. There were separated 9 g of compound II. The substance contained 1.27% of nitrogen. Based on the nitrogen analysis the H$_2$N-content was calculated to 0.9 mMole/g.

(b) 5 g (0.03 mole) of compound II containing 0.9 mMole/g of H$_2$N were suspended at 0° C in 100 ml of 5N hydrochloric acid and 20 ml of a NaNO$_2$ solution containing 2 g (0.029 mole) of NaNO$_2$ were added dropwise. The reaction mixture was stirred at 0° C for 1 hour. The resulting diazonium compound III was separated as a canary-yellow substance by filtration over a glass frit and washed several times at 0° C with distilled water. After a short lapse of time compound III was reacted further according to the description given in (c).

(c) 5 g of diazonium compound III were added while stirring at 10° C to 150 ml of a 4.8% 2-naphthol solution, the pH of which was adjusted with 2.2 g of NaOH to 12.5. After a reaction time of 5 minutes the dark reaction product was filtered off, washed with water, acetone and diluted hydrochloric acid and dried under reduced pressure. Thus 4.8 g of the product with 1-(2'-hydroxyphenylazo)-2-naphthol (Hyphan) as anchor group were obtained, containing 2.50% of N. The compound of formula IV prepared in this manner was titrated in its H$^+$-form in a 1 M NaCl solution with 0.1 N NaOH. The titration curve, as well as the N-analysis mentioned in (a), showed a capacity of 0.9 mMole/g. The H$^+$-form of the compound IV has a red color shade, in its Na-Form it displays a dark purple color and changes to dark brown when being loaded with ions of heavy metals such as iron ions, copper ions or uranyl ions.

In an analogous manner a further compound of formula IV was prepared with β-naphthylamine as R.

EXAMPLE 2

A cellulose derivative of formula IV with thenoyltrifluoroacetone as functional group was synthesized in three steps in a similar manner as described in Example 1. Steps (a) and (b) were identical with those described in Example 1. Step (c) was carried out as follows:

(c) 5 g of diazonium compound III were added at 10° C, while stirring, to 150 ml of a 4.4% TTA-solution (130 ml of H$_2$O + 20 ml of methanol) the pH of which is adjusted to 12.4 by 1.0 g of NaOH. After 10 minutes the dark reaction product was filtered off, washed with acetone, diluted hydrochloric acid and distilled water, and dried under reduced pressure. As a result 4.7 of a product were obtained with thenoyltrifluoroacetone (TTA) as anchor group, containing 2.40% of N. The titration curves and the N-contents showed a capacity of 0.85 mMole/g for the TTA cellulose compound. The compound displayed a red color shade in its H$^+$-form, and was brown in its Na-form.

Analogously, compounds with the following anchor groups R were prepared:
 (a) glyoxal-bis-(2-hydroxyanile)
 (b) ethylene diamine-N,N'-bis-(o-hydroxyphenylacetic acid)
 (c) 1,8-dihydroxynaphthalene-3,6-disulfonic acid (chromotropic acid)

The compounds prepared according to the afore described processes are relatively resistant against acids and are distinguished by a high selectivity, depending on the type of the functional group R. The stability in respect to acids is so high that in 0.1 molar HCl or HNO$_3$ no noticeable loss in capacity takes place within 24 hours, while the loss in capacity in 1 mole. HCl or HNO$_3$ at room temperature within 24 hours is about 5%, and in 3 mol. HCl or HNO$_3$ under identical conditions the loss in capacity is about 20%.

The compounds were used in their H$^+$-form. Thus, the compound prepared according to Example 1 exchanges selectively Cu$^{2+}$-ions, the glyoxal-bis-(2-hydroxyanile)-derivative exchanges UO$_2^{2+}$-ions.

The compounds are also capable of a selective exchange of said ions in concentrated salt solutions, e.g. in 0.5 M NaCl solution corresponding roughly in its salt content to sea water. The logarithms of the separation factors in 0.5 MNaCl solution are for the glyoxalbis-(2-hydroxyanile) in the range from pH 3 to 7; for uranyl ions in respect to tin ions and nickel ions about 1.5; for copper ions in respect to zinc ions and nickel ions also about 1.5; for uranyl ions in respect to magnesium ions about 2.7 and for copper ions in respect to magnesium ions also about 2.7; (the separation factor is the ratio of the distribution coefficients).

TABLE I:

| Functional Group | Selectivity for (in parenthesis pK$_1$ - values) |
|---|---|
| 8-Hydroxyquinolin | H$^+$(9,5), Hg$^{2+}$, Cu$^{2+}$(13), Fe$^{3+}$(14,5), UO$_2^{2+}$(11), Lu$^{3+}$(12) |
| Tiron | H$^+$(12), Fe$^{3+}$(20,8), Hf$^{4+}$(24,7) Cu$^{2+}$(14), Al$^{3+}$(17) |
| Chromotropic aid | H$^+$(14), Fe$^{3+}$(23), Al$^{3+}$(17,4) UO$_2^{2+}$(16,6), Cu$^{2+}$(13,3) |
| HyPhan | H$^+$(12,4), Cu$^{2+}$(23), Hg$^{2+}$, UO$_2^{2+}$, Fe$^+$ |
| Alizarin S | Al$^{3+}$, Zr$^{4+}$, Se$^{3+}$, Y$^{3+}$, Lanthanides |
| Morin | Al$^{3+}$, Be$^{2+}$, Se$^{3+}$, Ga$^{3+}$, In$^{3+}$, Ti$^{4+}$, Zr$^{4+}$ |
| Dithizone | H$_2$S - Metalle |
| Glyoxal-bis-(2-hydroxyanile) | UO$_2^{2+}$, Cu$^{2+}$ |

TABLE 1:-continued

| Functional Group | Selectivity for (in parenthesis $pK_1$ - values) |
|---|---|
| Salen | $UO_2^{2+}$, $Cu^{2+}$ |
| Salphen | $H^{30}$ (11), $UO_2^{2+}$ (21) $Ni^{2+}$ (5) |
| Chel I | $H^+$ (11), $Fe^{3+}$ (33), $Cu^{2+}$ (20), subgroup elements |
| Chel II | $H^+$ (12), $Fe^{3+}$ (40), $Cu^{2+}$, $Lu^{3+}$ (20) different subgroup elements $p_{K_1}$ 20 (values accord. to EDTA) |
| Chel III | |
| N-(2-Hydroxybenzyl)-iminodiacetic acid | subgroup-ions |
| Thioglycol acid amide (I) | $Hg^{2+}$, $Cd^{2+}$, $H_2S$ - Metalle |
| Thioglycol acid amide | accord. to (I) |

TABLE I:-continued

| Functional Group | Selectivity for (in parenthesis $pK_1$ - values) |
|---|---|
| (II) 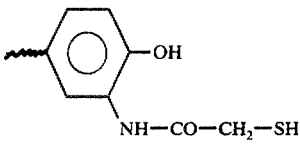 | |
| Diphenyl carbazide 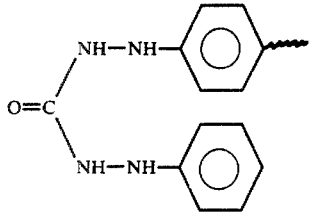 | $Cd^{2+}$, $Hg^{2+}$, |
| Salicylaldoxime 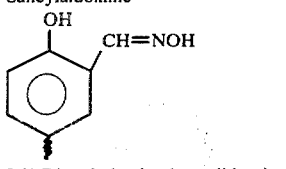 | $Cu^{2+}$, $Fe^{3+}$, $Pb^{2+}$, |
| 5-(4-Dimethylamino-benzylidene)-rhodanine 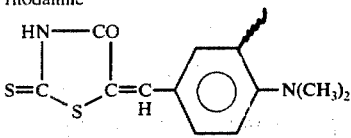 | $Au^{3+}$, $Pd^{2+}$, Pt, $Ag^+$, |
| TTA 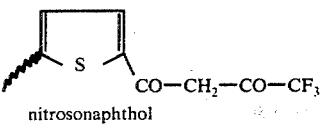 | $Me^{3+}$, $Me^{4+}$, |
| nitrosonaphthol 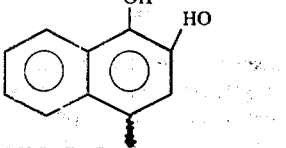 | $Co^{2+}$, $Cu^{2+}$, $Ni^{2+}$ |
| 5-U-PADAB 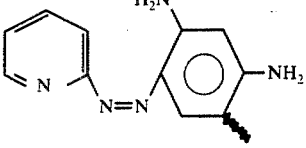 | $Co^{2+}$, |
| 4,4'Bis(-dimethylamino)-thiobenzophenone 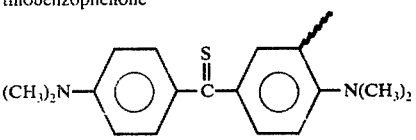 | $Hg^{2+}$, $Pd^{2+}$ |
| 4-Methoxy-2-(thiazolyl-2-azo) phenol TAM 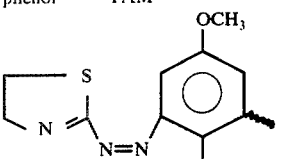 | $Hg^{2+}$ (highly selective) |
| 2,2'-Iminodibenzoic acid) Vanadone | $VO_2^+$, $Cu^{2+}$, $Hi^{2+}$ |

TABLE I:-continued

| Functional Group | Selectivity for (in parenthesis pK₁ - values) |
|---|---|
| 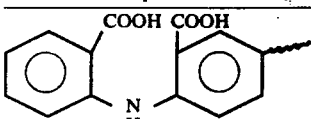 Chel IV | |

What is claimed is:

1. Ion exchange compounds based on cellulose and having the formula

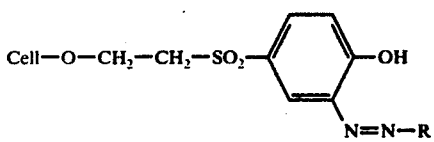

wherein R is a group forming chelate complexes with metal ions and Cell is the cellulose.

2. Ion exchange compounds according to claim 1, wherein R is the group

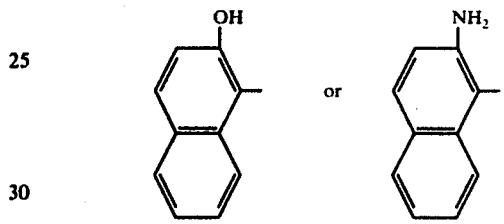

3. Process for the preparation of ion exchange compounds which comprises reacting the compound

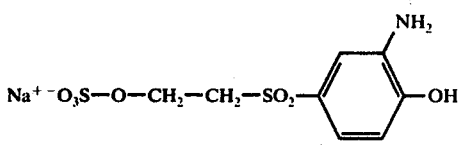

with cellulose in the presence of alkali, diazotizing the cellulose derivative resulting therefrom and subsequently coupling therewith couplable compounds which form chelate complexes with metal ions, to yield ion exchange, compounds.

* * * * *